Patented Sept. 23, 1941

2,256,604

UNITED STATES PATENT OFFICE 2,256,604

STABLE AQUEOUS SOLUTION OF 9-POLY-HYDROXYALKYL-ISOALLOXAZINES

Ernst Auhagen, Wuppertal-Elberfeld, Germany, assignor to Winthrop Chemical Company, Inc., New York, N. Y., a corporation of New York No Drawing. Application November 14, 1939, Serial No. 304,324. In Germany November 19, 1938

5 Claims. (Cl. 167—81)

This invention relates to a composition of matter, more particularly to a stable aqueous solution of 9-polyhydroxyalkyl-isoalloxazines.

9-polyhydroxyalkyl-isoalloxazines are only very difficultly soluble in water. Lactoflavin, that is 9-d-ribityl - 6,7 - dimethyl - isoalloxazine, for instance, dissolves in water only to 0.013%.

In accordance with the present invention stable aqueous solutions containing the said polyhydroxyalkyl-isoalloxazines in a relatively high concentration are obtainable by using pyridine-carboxylic acids in the form of their water-soluble salts or in the form of their N-none-substituted amides as solubilizing agents. The solutions which, when compared with aqueous solutions of the polyhydroxyalkyl-isoalloxazines only, contain a manifold quantity of the latter, can be obtained by using the solubilizing agent in a relatively slight concentration, for instance, in a concentration of 5% in aqueous solution. The solutions of the polyhydroxyalkyl-isoalloxazines may be prepared while simultaneously adding other suitable solubilizing agents, such as fatty acid alkylamides, ureas, sarcosinanhydride etc.

The new procedure has proved to be particularly suitable for the manufacture of solutions of lactoflavin, which are intended for therapeutic use.

At 20° C., for instance, a 5% aqueous solution of the sodium salt of nicotinic acid dissolves 0.1% lactoflavin, a 10% solution of the same salt 0.25% lactoflavin, a 6.4% solution of the lithium salt of nicotinic acid dissolves 0.1% lactoflavin, a 6.7% solution of the magnesium salt of nicotinic acid dissolves 0.1% lactoflavin, a 1% solution of the calcium salt of nicotinic acid dissolves 0.04% lactoflavin, a 5% solution of nicotinic acid amide dissolves 0.1% lactoflavin, a 10% solution of nicotinic acid amide dissolves 0.2% lactoflavin.

Urea has been suggested as a solubilizing agent for lactoflavin. Urea, however, has a considerably slighter dissolving power than the aforementioned products. Therefore, much higher concentrations of urea are required in order to dissolve corresponding quantities of the polyhydroxyalkyl-isoalloxazines. On the other hand it is known that therapeutic media which are difficultly soluble in water, such as quinine base and quinine hydrochloride, purines, diallylbarbituric acid, camphor and some other products can be dissolved in water only by using pyridine carboxylic acid amides which are alkylated at the amide-nitrogen atom, whereas pyridine carboxylic acid amides none-alkylated at the amide-nitrogen atom do not have such a dissolving power. In view of these facts it is most surprising that according to the present invention stable aqueous solutions of the polyhydroxyalkyl-isoalloxazines of a relatively high concentration are obtainable by using those pyridine-amides which are not substituted at the amide-nitrogen atom, by using water-soluble salts of the pyridine carboxylic acids, respectively.

I claim:

1. As a composition of matter a stable aqueous solution comprising a 9-polyhydroxyalkyl-isoalloxazine in a concentration of more than 0.013% and a water-soluble solubilizing agent selected from the group consisting of nicotinic acid amide and water-soluble salts of nicotinic acid.

2. As a composition of matter a stable aqueous solution comprising lactoflavin in a concentration of more than 0.013% and a water-soluble solubilizing agent selected from the group consisting of nicotinic acid amide and water-soluble salts of nicotinic acid.

3. As a composition of matter a stable aqueous solution comprising a 9-polyhydroxyalkyl-isoalloxazine in a concentration of more than 0.013% and nicotinic acid amide.

4. As a composition of matter a stable aqueous solution comprising lactoflavin in a concentration of more than 0.013% and nicotinic acid amide.

5. The process of producing stable aqueous solutions containing a 9-polyhydroxyalkyl-isoalloxazine in a concentration of more than 0.013% which comprises dissolving such a compound in water in the presence of a small amount of a water-soluble solubilizing agent selected from the group consisting of nicotinic acid amide and water-soluble salts of nicotinic acid.

ERNST AUHAGEN.